Figure 1:
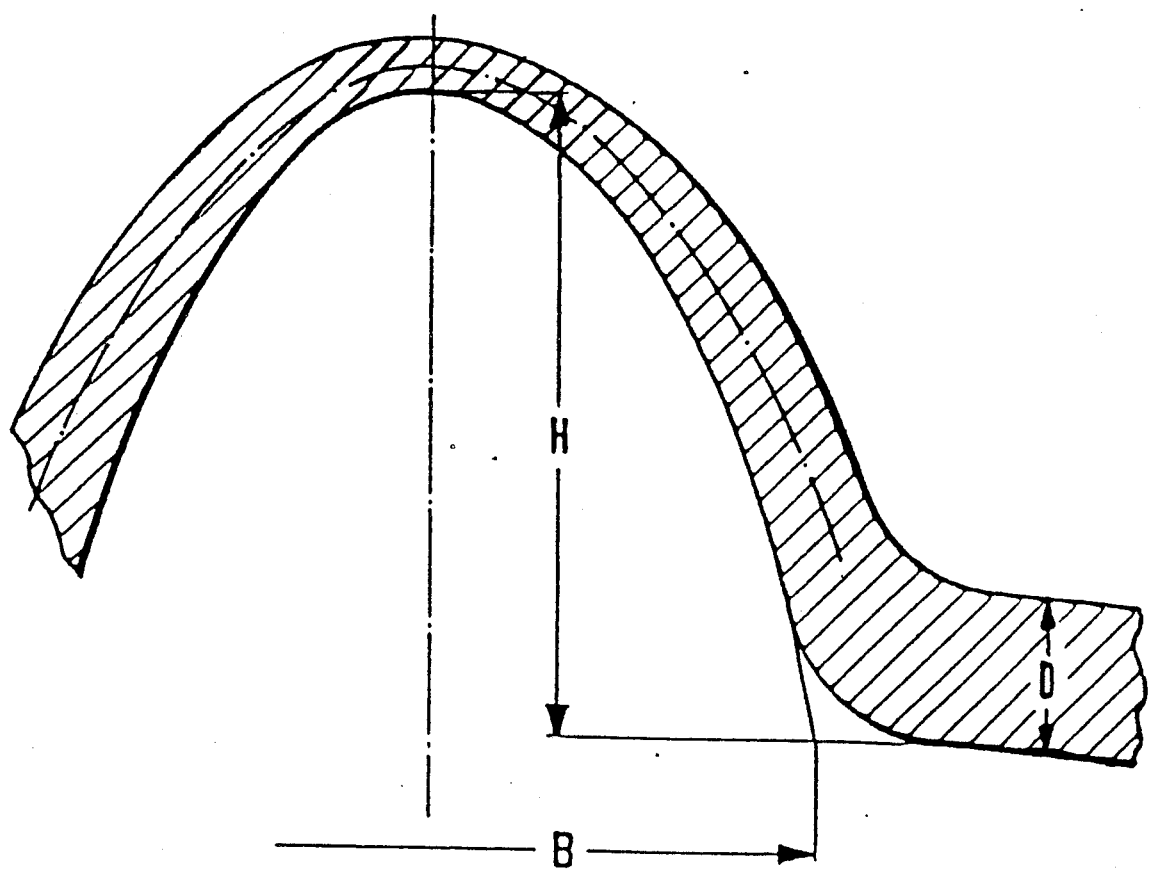

United States Patent [19]
Widmann

[11] Patent Number: 5,080,790
[45] Date of Patent: Jan. 14, 1992

[54] STRIP-SHAPED FILTER MATERIAL WITH CRIMPS MOLDED IN AND FILTER ELEMENTS MADE OF THIS MATERIAL

[75] Inventor: Sigbert Widmann, Donzdorf, Fed. Rep. of Germany

[73] Assignee: Knecht Filterwerke GmbH, Stuttgart, Fed. Rep. of Germany

[21] Appl. No.: 603,775
[22] PCT Filed: Apr. 29, 1989
[86] PCT No.: PCT/DE89/00277
§ 371 Date: Oct. 31, 1990
§ 102(e) Date: Oct. 31, 1990
[87] PCT Pub. No.: WO89/10781
PCT Pub. Date: Nov. 16, 1989

[30] Foreign Application Priority Data
May 4, 1988 [DE] Fed. Rep. of Germany ....... 3815145
May 4, 1988 [DE] Fed. Rep. of Germany ....... 3815146

[51] Int. Cl.⁵ .............................................. B01D 29/07
[52] U.S. Cl. .................................. 210/493.5; 55/497; 55/500; 55/521
[58] Field of Search ............... 210/493.1, 493.3, 493.4, 210/493.5; 55/500, 521, 497, 498, 499

[56] References Cited
U.S. PATENT DOCUMENTS
3,062,378 11/1962 Briggs .............................. 210/493.5

Primary Examiner—Frank Sever
Attorney, Agent, or Firm—Collard, Roe & Galgano

[57] ABSTRACT

The instant invention provides a strip shaped filter material having a longitudinal plane with crimps molded therein for filtering a liquid or a gas comprising filter material being folded in a zigzag shape and having individual fold segments; said individual fold segments being held at a distance from one another via the crimps; said filter material having nondeformed filter strip segments adjacent to each crimp; said crimp having a zenith height; and the filter material having a thickness, in a cross section placed perpendicular to the longitudinal plane of the strip, which constantly decreases within the area of the crimps, starting from the nondeformed filter strip segments, up to the zenith height of the crimp, and that at the same time, the filter material is increasingly compressed in the direction of decreasing thickness.

14 Claims, 3 Drawing Sheets

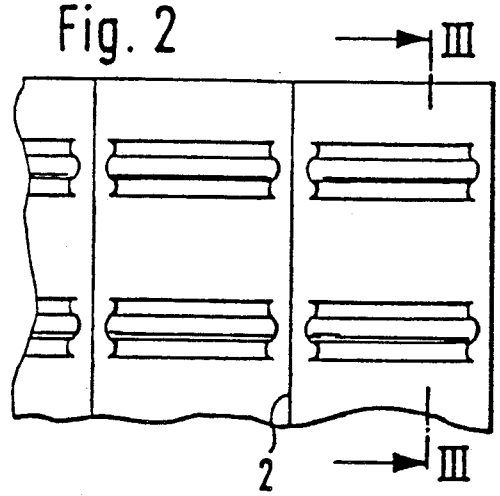
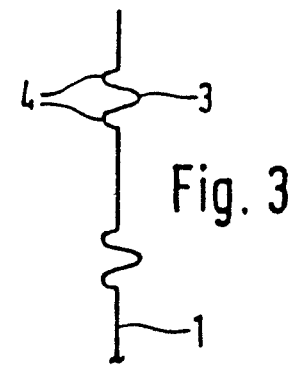
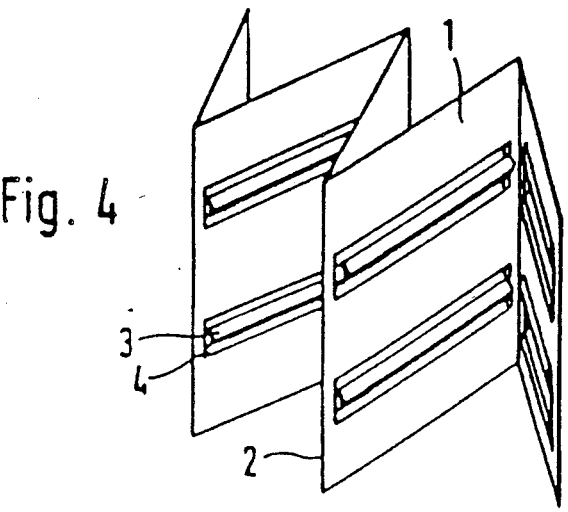
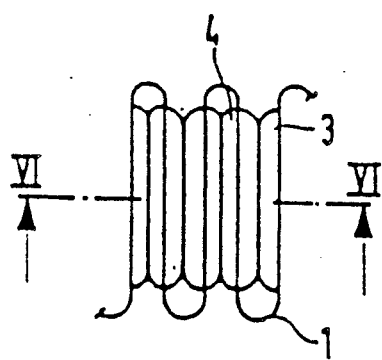
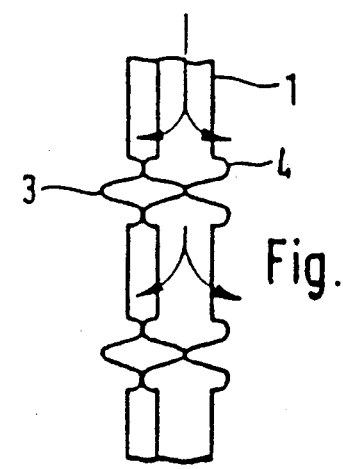

STRIP-SHAPED FILTER MATERIAL WITH CRIMPS MOLDED IN AND FILTER ELEMENTS MADE OF THIS MATERIAL

The invention relates to strip-shaped filter material, especially filter paper for liquid or gas filters, with crimps molded in, pursuant to the preamble of claim 1, as well as filter elements made of these materials, pursuant to the preambles of claims 7 and 10.

Crimps in filter papers have always had semi-circular cross-sections until now (for example, DE-OS [German laying-out statement] 19 30 715). With such crimps, the paper thickness is always least at the transition from the non-deformed level filter surface into the crimp, which can result in material-related filtration problems at these sites, which are under high static and dynamic stress during filter operation.

Filter elements made of strip material with crimps which is folded in zig-zags are also known, for example from DE-PS [German Patent] 12 48 618.

To the extent that filter elements with crimped filter strip materials are known beyond this, from DE-OS 19 22 976 and DE-OS 26 51 910, these do not demonstrate sufficient stability under extreme operating stress.

Proceeding from this situation, the invention is based on the task of providing crimps in the filter strip materials in such a way, and shaping them into filter elements with zig-zag-shaped folds, so that great static stability of the folds of the filter element can be achieved, while at the same time, the filter material is not damaged by the crimps.

This task is accomplished, for one thing, by the structure of the crimp shapes according to the characterizing section of claim 1, and for another thing, by the arrangement and shape of the crimps within the strip material, and its zig-zag folding to form a filter element according to the characterizing sections of claims 7, 8 and 10.

Practical developments of the invention are the object of the secondary claims.

Embodiments of the invention are shown in the drawing. The drawing shows:

FIG. 1 a cross-section through a crimp running vertical to the plane of the filter strip FIG. 2 a top view of a part of a filter material strip FIG. 3 a cross-section through the filter material strip along Line III—III on an enlarged scale FIG. 4 a perspective view of a segment of a filter strip folded in zig-zag shape FIG. 5 a view of the frontal side of a filter element folded in zig-zag shape FIG. 6 a cross-section along Line VI—VI through the folds of the filter element according to FIG. 5

Figure 7:
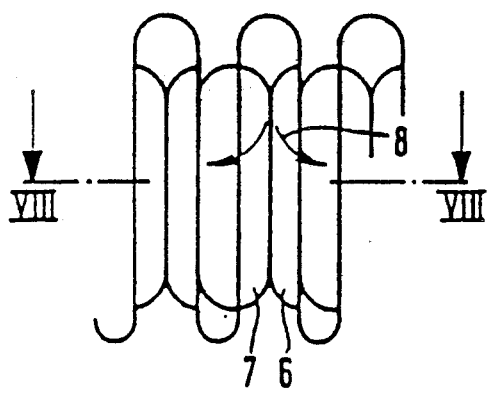
Figure 8:
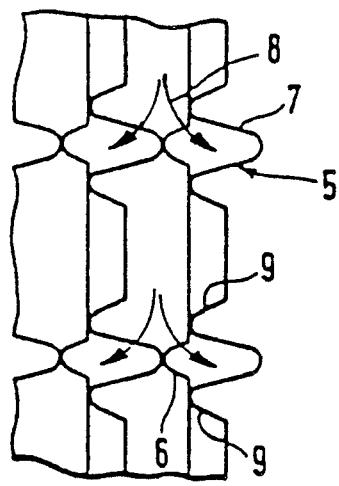

FIG. 7 a view of the frontal side of an alternative embodiment of a filter element folded in zig-zag shape FIG. 8 a cross-section along Line VIII—VIII through the folds of the filter element according to FIG. 7

Figure 9:
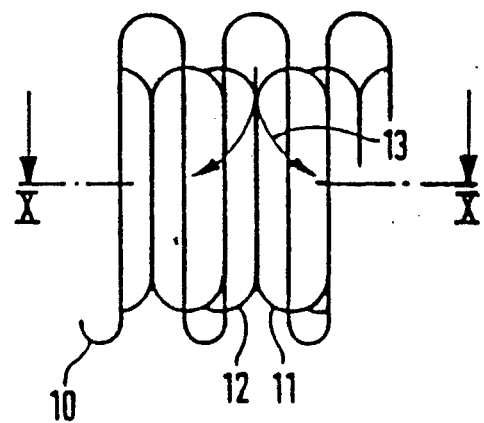
Figure 10:
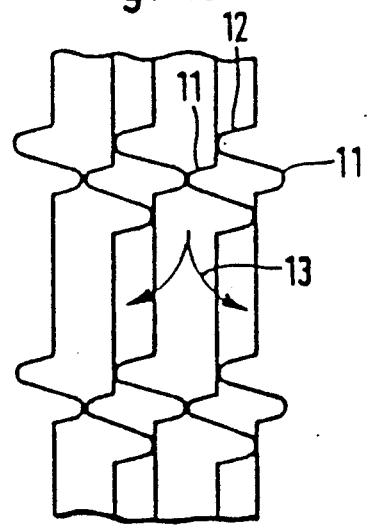

FIG. 9 a view of the frontal side of another embodiment of a filter element folded in zig-zag shape FIG. 10 a cross-section along Line X—X through the folds of the filter element according to FIG. 9

In the crimp shown in cross-section in FIG. 1, the progression of the funicular curve, which determines the shape of the curvature of the crimp in this case, is entered with a dot-dash line.

A funicular curve is a mathematical concept and is defined by the progression of a chain with an infinite number of links, under the stress of its own weight. Such a funicular curve is also called a catenary curve, in some instances.

By adapting the curvature of the crimp to the progression of a funicular curve, a significant increase in inherent stability is achieved, as compared with known crimp shapes.

In FIG. 1, H stands for the crimp height, B for the crimp width and D for the filter paper thickness.

In the embodiment according to FIG. 1, the filter material has a thickness, in cross-sections placed perpendicular to the strip plane, which constantly decreases within the area of the crimps, starting from the non-deformed filter strip segments, to the zenith height H of the crimp, with the filter material being compressed in the direction of decreasing thickness.

In this embodiment, a dimensional reduction in thickness in the direction of the zenith height H of the crimp also exists perpendicular to the filter strip plane of a cross-sectional plane placed through a crimp.

In the case of a crimp directed longitudinally, the thickness is always the same, at least in the flanks opposite each other lateral to the longitudinal direction, with the same vertical distance to the non-deformed filter strip plane in each case.

The crimps have a width B within the non-stamped filter strip plane, which is in a ratio of less than 2 to the zenith height H.

At the zenith of the crimp shown in FIG. 1, the thickness of the filter material is less than 80% of the thickness of the non-deformed filter material. In the following, the filter strip material shown in FIG. 2-6 and the way it is folded in zig-zag shape will be described.

The filter strip material 1 is provided with individual fold lines lateral to its longitudinal expanse, around which the strip material can be folded in zig-zag shape. Double crimps are stamped into the strip material at right angles to the fold lines 2. These double crimps consist of an upstream crimp 3 which will be on the upstream side of the filter in readiness for use, and two downstream crimps 4 which will extend from the flanks of this crimp directly to the other side of the filter strip.

The upstream crimp 3 extends farther out perpendicular on the material strip than the two downstream crimps 4 assigned to it.

When the filter material strip 1 is folded in zig-zag shape, the upstream crimps 3 of two adjacent fold segments lie together on the upstream side, while support is given via the smaller downstream crimps 4 on the downstream side.

The arrangement of the crimps 3 and 4 allows symmetrical support of the individual filter strip fold segments over the width of the filter strip, especially on the downstream side. In this way, extremely secure support against collapse of the filter strip fold segments can be achieved, while maintaining a large free filter surface.

The embodiment according to FIG. 7 and 8 is structured as follows. The filter strip material is laid in individual folds lateral to its longitudinal expanse. The W-shaped crimps 5 alternate with V-shaped crimps 6 in the longitudinal direction of the filter strip, at equal intervals. The unilateral elevation 7 of the W-shaped crimps 5 as well as the V-shaped crimp 6 each project out of the filter strip material on the upstream side.

The flow direction of the filter strip material is indicated by the arrows 8.

The folds are laid in such a way, in each case, that the downstream elevations 9 of the crimp 5 rest against the foot of the V-shaped crimp 6 on the downstream side.

The arrangement of the crimps 5 and 6 allows symmetrical support of the individual filter strip fold segments, especially on the downstream side. In this way, extremely secure support against collapse of the filter strip segments can be achieved, while maintaining a large free filter surface. In addition, greater flow space is available on the upstream side than on the downstream side, between the individual folds.

The embodiment according to FIG. 9 and 10 looks as follows.

The filter strip material 10 is folded in zig-zag shape lateral to its longitudinal expanse. On the upstream and downstream sides, crimps 11 and 12, respectively, project out of the filter strip. The flow-through direction of the filter material is marked with arrows 13. The folds of the strip material are laid in such a way that the crimps 11, which project out on the upstream side, rest against each other at their foot areas on the downstream side and at their head area on the upstream side in each case.

I claim:

1. Strip-shaped filter material having a longitudinal plane with crimps molded therein for filtering a liquid or a gas comprising
   filter material being folded in a zig-zag shape and having individual fold segments;
   said individual fold segments being held at a distance from one another via the crimps;
   said filter material having non-deformed filter strip segments adjacent to each crimp;
   said crimp having a zenith height; and
   the filter material having a thickness, in a cross-section placed perpendicular to the longitudinal plane of the strip, which constantly decreases within the area of the crimps, starting from the non-deformed filter strip segments, up tot he zenith height-of the crimp, and that at the same time, the filter material is increasingly compressed in the direction of decreasing thickness.

2. The filter material according to claim 1,
   wherein in every cross-sectional plane placed through a crimp perpendicular to the filter strip longitudinal plane, a dimensionally uniform reduction in thickness in the direction of each zenith height of the individual crimp also exists.

3. The filter material according to claim 2,
   wherein at the zenith of each crimp, the thickness of the filter material is less than 80% of the thickness of the non-deformed filter strip segments.

4. The filter material according to claim 1,
   wherein in the longitudinal direction of the crimp, the thickness is always the same;
   said filter material having flanks between the crimps; and
   said flanks located opposite each other laterally to the longitudinal direction of the filter material, with the same vertical distance from the flank to each non-deformed filter strip segment.

5. The filter material according to claim 1,
   wherein the crimps are curved along a funicular curve at least in a cross-sectional plane running perpendicular to the non-deformed filter strip, starting from the filter strip longitudinal plane.

6. The filter material according to claim 5,
   wherein the crimps have a width within the non-stamped filter strip which is less than twice the zenith height.

7. The filter element made of a strip of a relatively thin-walled filter material folded in a zig-zag shape, which has lengthwise crimps according to claim 5 which project between the folded edges out of the longitudinal plane of the strip, both on the upstream side and the downstream side, to hold the reciprocal distance of the folds, and in which non-deformed, level segments are between the crimps of the same fold surface;
   an upstream crimp which projects out of the filter material strip on the upstream side;
   said upstream crimp having two longitudinal sides and passes over, at its two longitudinal sides, into a downstream crimp;
   said downstream crimp projects out of the other side of the filter material strip;
   each upstream crimp being equal in height to all the upstream crimps;
   each downstream crimp being equal in height to all the downstream crimps;
   with the equal heights of the downstream crimps being smaller than the equal heights of the upstream crimps; and
   that adjacent strips resting on each other each touch against each other with their upstream crimps, on the one hand, and with their downstream crimps, on the other hand.

8. The filter element made of a strip of a relatively thin-walled filter material folded in a zig-zag shape, which has lengthwise crimps according to claim 5 which project between the folded edges out of the longitudinal plane of the strip, both on the upstream side and the downstream side, to hold the reciprocal distance of the folds, and in which non-deformed, level segments exist between the crimps of the same fold surface;
   said strip having two longitudinal sides;
   alternating V-shaped and W-shaped crimps are arranged running alternately in the longitudinal direction of the strip;
   each W-shaped crimp comprising an elevation which projects out of the filter material strip on the upstream side, which passes over, in each case, into and elevation which projects out of the filter material strip on the downstream side, at each of its two longitudinal sides, with each of two downstream elevations having the same height;
   the V-shaped crimps only projecting out of the filter material strip on the upstream side, with the span width between the V-shanks at the transition of the filter strip being less than or equal to the maximum span width between the long shanks of the W-shaped crimps, and;
   the fold lines are placed in such a way that the W-shaped crimps and the V-shaped always come to rest symmetrically on top of each other.

9. The filter element made of a strip of a relatively thin-walled filter material folded in a zig-zag shape, which has lengthwise crimps according to claim 5 adjacent to each other and passing into each other in the filter strip longitudinal plane, which project between the folded edges out of the plane of the strip, both on the upstream side and the downstream side, to reciprocally hold the distance of the folds, and in which nondeformed level segments exist between the adjacent pairs of crimps within the same fold surface;
- each crimp having a foot area on the downstream side and having a head area on the upstream side;
- a folding of the filter strip material in which the crimps which project out on the upstream side rest against each other at their foot areas on the downstream side and at their head area on the upstream side in each case.

10. The filter element of a strip of a relatively thin-walled filter material folded in a zig-zag shape, which has lengthwise crimps according to claim 1, which project between the folded edges out of the longitudinal plane of the strip both on the upstream side and the downstream side, to hold the reciprocal distance of the folds, and in which non-deformed, level segments are between the crimps of the same fold surface;
- an upstream crimp which projects out of the filter material strip on the upstream side;
- said upstream crimp having two longitudinal sides and passes over, at its two longitudinal sides, into a downstream crimp;
- said downstream crimp projecting out of the other side of the filter material strip;
- each upstream crimp being equal in height to all the upstream crimps;
- each downstream crimp being equal in height to all the downstream crimps;
- with the equal heights of the downstream crimps being smaller than the equal heights of the upstream crimps; and
- that adjacent strips resting on each other each touch against each other with their upstream crimps, on the one hand, and with their downstream crimps, on the other hand.

11. The filter element made of a strip of a relatively thin-walled filter material folded in a zig-zag shape, which has lengthwise crimps according to claim 1 which project between the folded edges out of the longitudinal plane of the strip, both on the upstream side and the downstream side, to hold the reciprocal distance of the folds, and in which non-deformed, level segments are between the crimps of the same fold surface;
- said strip having two longitudinal sides;
- alternating V-shaped and W-shaped crimps are arranged running alternately in the longitudinal direction of the strip;
- each W-shaped crimp comprising an elevation which projects out of the filter material strip on the upstream side, which passes over, in each case, int and elevation which projects out of the filter material strip on the downstream side, at each of its two longitudinal sides, with each of two downstream elevations having the same height;
- the V-shaped crimps only projecting out of the filter material strip on the upstream side, with the span width between the V-shanks at the transition to the filter strip being less than or equal to the maximum span width between the long shanks of the W-shaped crimps; and
- the fold lines are placed in such a way that the V-shaped crimps and the W-shaped crimps always come to rest symmetrically on top of each other.

12. The filter element according to claim 11,
- wherein the downstream V-crimp and W-crimp each projects from the filer material strip longitudinal plane to the same height.

13. The filter element made of a strip of relatively thin-walled filter material folded in a zig-zag shape, which has lengthwise crimps according to claim 1, adjacent to each other and passing into each other in the filter strip longitudinal plane, which project between the folded edges out of the plane of the strip, both on the upstream side and the downstream side, to reciprocally hold the distance of the folds, and in which non-deformed level segments exist between the adjacent pairs of crimps within the same fold surface;
- each crimp having a foot area on the downstream side and having a head area on the upstream side;
- a folding of the filter strip material in which the crimps which project out on the upstream side rest against each other at their foot areas on the downstream side and at their head area on the upstream side in each case.

14. The filter element according to claim 13,
- wherein the height of the crimps which project out on the upstream side is greater than that of the crimps which project out on the downstream side.

* * * * *